United States Patent Office 3,236,808
Patented Feb. 22, 1966

3,236,808
POLYSULFONATE COPOLYMERS
Eugene P. Goldberg, Des Plaines, and Frank Scardiglia, Elmwood Park, Ill., assignors to Borg-Warner Corporation, Chicago, Ill., a corporation of Illinois
No Drawing. Filed Jan. 3, 1961, Ser. No. 80,014
13 Claims. (Cl. 260—49)

This invention relates to linear condensation copolymers and in particular to condensation copolymers derived from diphenols and mixed aryl disulfonic acids or disulfonyl halides. More particularly, this invention relates to linear copolymers containing aromatic and mixed aryl sulfonate linkages in the linear chain and to the process for making these new copolymers.

Various polysulfonate homopolymers are known in the art. However, because the homopolymers have not demonstrated useful combinations of properties, they find almost no commercial utility in plastics applications.

We have discovered a new class of aromatic polysulfonate copolymer compositions characterized by good physical, chemical and electrical properties. These new compositions may generally be considered to have high softening temperatures and unusual chemical stability as well as desirable strength properties. Although remarkably resistant to acids, bases and oils, they are soluble in specific organic solvents, thus permitting the formation of fibers or films from solution. They may also be formed into useful parts and objects by conventional thermoplastic fabricating techniques, such as extrusion, injection or compression molding, hot spraying and fluid bed methods.

The compositions of this invention comprise aromatic polysulfonate copolymers containing structural units derived from a diphenol and two or more aromatic disulfonyl halides, the structural units occurring in various fashions in the linear copolymer chain. More specifically, the copolymers may be of a random type in which the structural units are propagated along the copolymer chain in a random manner. Another type would be random-block in which the structural units are randomly arranged in the linear chain but in which one of the unit structures is itself polymeric. Such structures may be achieved, for example, by the formation of an aryl polysulfonate using a single aryl disulfonyl halide followed by addition of a second aryl disulfonyl halide and further polycondensation. Additional structural modifications would include block types in which both structural units are polymeric, block-block. It is apparent that block structures themselves are susceptible to regular or random arrangement as indicated by the method of preparation.

The compositions of the present invention comprise linear condensation copolymers prepared typically under interfacial polycondensation conditions from a diphenol and two or more aryl disulfonyl halides. Essentially any dihydric phenol is useful in the practice of this invention. The diphenol may be generally represented by Formula I:

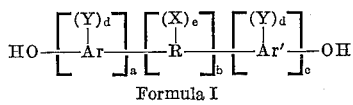

Formula I where R is an alkylene linkage, e.g., methylene, ethylene, propylene, isopropylene, butylene, isobutylene, amylene, etc., or a linkage selected from the group consisting of ether, carbonyl, amino or a sulfur containing linkage, e.g., sulfide, sulfoxide, sulfone, or a silicone containing linkage, e.g., silane or siloxy. R can also consist of two or more alkylene linkages connected by such groups as aromatic, amino, ether, carbonyl, silane, siloxy, sulfide, sulfoxide, sulfone, etc. Other groups which are represented by R will occur to those skilled in the art.

Ar and Ar' are mono- or polycarbocyclic aromatic groups such as phenylene, biphenylene, terphenylene, naphthylene, etc. Ar and Ar' may be the same or different. Y is a substituent selected from the group consisting of organic, inorganic, or organometallic radicals. The substituents represented by Y include (1) halogen, e.g., chlorine, bromine, fluorine or (2) ether groups of the general formula OE, where E is a monovalent hydrocarbon radical similar to R or (3) monovalent hydrocarbon groups of the type represented by R or (4) other substituents, e.g., nitro, cyano, etc., said substituents being essentially inert to the polymerization reaction environment.

$d$ is a whole number ranging from 0 to a maximum equivalent to the number of replaceable hydrogens substituted on the aromatic rings comprising Ar or Ar'. $e$ is a whole number ranging from 0 to a maximum controlled by the number of replaceable hydrogens on R. $a$, $b$, and $c$ are whole numbers including 0. When $b$ is not 0, neither $a$ nor $c$ may be 0. Otherwise either $a$ or $c$, but not both, may be 0. Where $b$ is 0 in Formula I, the aromatic groups are joined by a direct bond between the carbocyclic ring carbon atoms wth no connecting alkyl or other linkage. The hydroxyl and Y substituents on the aromatic groups, Ar and Ar', can be varied in the ortho, meta or para positions on the aromatic rings and the groups can be in any possible geometric relationship with respect to one another.

Examples of difunctional phenols that are useful in the practice of this invention include bisphenols of which the following are representative: 2,2-bis-(4-hydroxyphenyl)-propane (Bisphenol-A); bis-(2-hydroxyphenyl)-methane; bis-(4-hydroxyphenyl)-methane; 1,1-bis-(4-hydroxyphenyl)-ethane; 1,2-bis-(4-hydroxyphenyl)-ethane; 1,1-bis-(2-chloro-4-hydroxyphenyl)-ethane; 1,1-bis-(2,5-dimethyl-4-hydroxyphenyl)-ethane; 2,2-bis-(3-phenyl-4-hydroxyphenyl)-propane; 2,2-bis-(4-hydroxynaphthyl)-propane; 2,2-bis-(4-hydroxyphenyl)-pentane; 2,2-bis-(4-hydroxyphenyl) - hexane; bis-(4-hydroxyphenyl)-phenylmethane; bis-(4-hydroxyphenyl)-cyclohexylmethane; 1,2-bis - (4-hydroxyphenyl)-1,2-bis-(phenyl)-ethane; 2,2-bis-(4-hydroxyphenyl)-1-phenylpropane; bis-(4-hydroxy-5-nitrophenyl)-methane; bis-(4-hydroxy-2,6-dimethyl-3-methoxyphenyl) - methane; 2,2-bis-(2,6-dichloro-4-hydroxyphenyl) - propane; 2,2-bis-(2-bromo-4-hydroxyphenyl)-propane.

The preparation of these and other applicable bisphenols is known in the art. They are most commonly prepared by condensation of two moles of a phenol with a single mole of a ketone or aldehyde.

Also useful are dihydroxybenzenes typified by hydroquinone and resorcinol; dihydroxybiphenyls such as 4,4'-dihydroxybiphenyl; 2,2'-dihydroxybiphenyl; 2,4'-dihydroxybiphenyl; and dihydroxynaphthalenes such as 2,6-dihydroxynaphthalene, etc.

Dihydroxyaryl sulfones are also useful such as bis-(4-hydroxyphenyl)-sulfone; 2,4'-dihydroxyphenyl sulfone; 2,4'-dihydroxy-5'-chlorophenyl sulfone; 3'-chloro-4,4'-dihydroxyphenyl sulfone; bis-(4-hydroxyphenyl)-biphenyl disulfone, etc. The preparation of these and other useful dihydroxyarylsulfones is described in Patent 2,288,282, Huissmann. Polysulfones, as well as sulfones substituted with halogen, nitro, alkyl and other substituents are also useful. In addition, related sulfides and sulfoxides are applicable.

Dihydroxyaromatic ethers are useful and may be prepared by methods found in Patent 2,739,171, Linn, and in "Chemical Reviews," 38,414–417 (1946). Typical of such dihydroxyaryl ethers are the following: 4,4'-dihydroxyphenyl ether; 4,4'-dihydroxy-2,6-dimethylphenyl ether; 4,4'-dihydroxy-3,3'-diisobutylphenyl ether; 4,4'-dihydroxy-3,3'-diisopropylphenyl ether; 4,4'-dihydroxy-3,2'-dinitrophenyl ether; 4,4'-dihydroxy-3,3'-dichlorophenyl ether; 4,4'-dihydroxynaphthyl ether; 2,4'-dihydroxytetraphenyl ether; 4,4'-dihydroxytriphenyl ether; 4,4'-dihydroxy-2,6-dimethoxyphenyl ether, etc. The many other types of suitable dihydroxyaryl compounds will be apparent to those skilled in the art.

Formula I for the diphenols may also be more generally and conveniently depicted by Formula II, wherein the aromatic carbocyclic group D represents all of the Formula I molecule except the hydroxyl functions:

HO—[D]—OH

Formula II

Aromatic sulfonyl halides react readily with phenols or their salts to give aromatic sulfonates according to the following reaction:

$$ArSO_2Cl + Ar'OX \rightarrow ArSO_2OAr' + XCl$$

in which X is either hydrogen or an alkali metal and Ar and Ar' are aromatic groups. To obtain a linear high molecular weight polymer, the sulfonyl halides and the phenol reactants must be bifunctional. The reagents used in the polymerization must also be very pure and essentially free of mono- and polyfunctional materials which could promote low molecular weight or crosslinking.

The aromatic disulfonyl halides or chlorides are prepared most conveniently by direct reaction of an aromatic hydrocarbon with chlorosulfonic acid, $$H-Ar-H + 4ClSO_3H \rightarrow$$
$$ClO_2S-Ar-SO_2Cl + 2HCl + 2H_2SO_4$$

or by the disulfonation of an aromatic compound followed by treatment with a chlorinating agent such as PCl$_5$, PCl$_3$, SOCl$_2$ or COCl$_2$ by methods which are well known in the art.

$$H-Ar-H + 2H_2SO_4 \rightarrow HO_3S-Ar-SO_3H + 2H_2O$$
$$HO_3S-Ar-SO_3H + \text{chlorinating agent} \rightarrow$$
$$ClO_2S-Ar-SO_2Cl$$

Essentially, any aromatic disulfonyl chloride is useful in the practice of this invention and may be generally represented by Formula III:

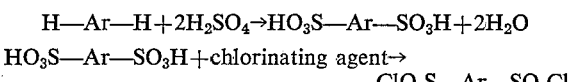

Formula III where Ar'' and Ar''' are aromatic groups as defined before for Ar and Ar' in Formula I and where they may be the same or different with respect to one another or with respect to Ar and Ar'. Y, X, $a$, $b$, $c$, and $d$ are as defined for Formula I. Formula III for the aryl disulfonyl chlorides may also be more generally and conveniently depicted by Formula IV, wherein the aromatic carbocyclic group G represents all of the Formula III molecule except the sulfonyl chloride functions:

ClO$_2$S—[G]—SO$_2$Cl

Formula IV

Examples of aromatic disulfonyl chlorides that are useful in the practice of this invention include benzenedisulfonyl chlorides of which the following are representative: o-, m-, and p-benzenedisulfonyl chloride; 1-chloro-2,4-benzenedisulfonyl chloride; 1-bromo-3,5-benzenedisulfonyl chloride; 1-nitro-3,5-benzenedisulfonyl chloride; 1-methyl-2,4-beneznedisulfonyl chloride; 1-methyl-4-chloro-2,6-benzenedisulfonyl chloride; 1-ethyl-2,4-benzenedisulfonyl chloride; 1,2-dimethyl-3,5-benzenedisulfonyl chloride; 1,3-dimethyl-2,4-benzenedisulfonyl chloride; 1,4-dimethyl-2,6-benzenedisulfonyl chloride; 1-methoxy-2,4-benzenedisulfonyl chloride.

Also useful are biphenyldisulfonyl chlorides of which the following are typical: 2,2'-biphenyldisulfonyl chloride; 3,3'-biphenyldisulfonyl chloride; 4,4'-biphenyldisulfonyl chloride; 4,4'-dibromo-3,3'-biphenyldisulfonyl chloride; 4,4'-dimethyl-3,3'-diphenyldisulfonyl chloride.

Arylsulfonedisulfonyl chlorides, such as 3,3'-phenylsulfonedisulfonyl chloride, are useful as are diarylalkane compounds typified by 4,4'-diphenylmethanedisulfonyl chloride; 2,2-bis-(4-phenylsulfonyl chloride)-propane; etc.

Aryl ether disulfonyl chlorides such as 4,4'-phenyletherdisulfonyl chloride; 2,4'-phenyletherdisulfonyl chloride; 4,4'-biphenyletherdisulfonyl chloride; etc., are applicable as are naphthalene and anthracene derivatives such as the following: 1,3-naphthalenedisulfonyl chloride; 2,6-naphthalenedisulfonyl chloride; 1-chloro-2,7-naphthalenedisulfonyl chloride; 1-chloro-3,5-naphthalenedisulfonyl chloride; 1-nitro-3,6-naphthalenedisulfonyl chloride; 2-ethoxyl-1,6-naphthalenedisulfonyl chloride; 1,5-anthracenedisulfonyl chloride; 1,8-anthracenedisulfonyl chloride; etc.

Numerous other types of suitable aromatic disulfonyl chlorides will be apparent to those skilled in the art.

The use of two or more aromatic disulfonyl chlorides results in copolymer compositions whose properties may be widely varied according to the structure and relative proportions of the disulfonyl chlorides. For example, a relatively stiff molecular chain, as obtained with a benzenedisulfonyl chloride, is made more flexible, and consequently tougher, through copolymerization with a less rigid disulfonyl chloride such as may be derived from a diphenyl ether. The relative proportions of the two or more aromatic disulfonyl chlorides may be widely varied such that any one aromatic disulfonyl chloride, as typified by Formula III or IV, may constitute as little as 5 wt. percent or as much as 95 wt. percent of the total aromatic disulfonyl chloride mix.

Although the materials of this invention may be prepared by such conventional condensation procedures as direct thermal reaction of the disulfonyl halides and a diphenol or by solution polymerization involving the disulfonyl halides and a diphenol in basic organic media, it is preferred to conduct the polycondensation via an interfacial polymerization technique. Generally speaking, the interfacial polycondensation requires relatively pure aryl disulfonyl halides, most conveniently the disulfonyl chlorides, and diphenols as herein previously indicated. Polymerizations may be carried out at or near room temperature by mixing a basic aqueous solution of the sodium salt of the diphenol with the mixture of two or more disulfonyl chlorides contained in an inert organic solvent. The addition of a basic organic catalyst such as a quaternary ammonium salt or a suitable amine is useful in promoting higher molecular weights. The reaction mixtures are preferably stirred vigorously for varying periods of time and the copolymers precipitated or coagulated by any suitable means as, for example, by addition to a non-solvent such as isopropyl alcohol. The precipitated copolymers are generally washed to remove any residual impurities and dried.

The organic solvent utilized for the disulfonyl chloride mixture may be any inert organic solvent which preferably also has some solvent power with respect to the polymer formed. Typical of such solvents are methylene chloride, tetrachloroethylene, tetrachloroethane, chloroform, carbon tetrachloride, o-dichlorobenzene, etc. The concentration of reactants in the aqueous and organic phases may vary over a relatively wide range, from less than 1 wt. percent to more than 20 wt. percent being limited at the high concentrations only by the increasing difficulties encountered in handling the extremely viscous media encountered. Polymerization time may be varied from less than five minutes to more than three hours depending upon the reactivity of the copolymer reactants and the molecular weight desired. Extremely short polymerization periods will generally result in lower molecular weight copolymers as compared with longer polymerization times which give higher molecular weights. Although it is preferred to use approximately equimolar quantities of diphenol and the disulfonyl chloride mix, the reactivity of the sulfonyl chlorides and the reaction conditions are such that the use of exact stoichiometry is not critical to the attainment of relatively high molecular weights. Thus, in fact, block copolymers are readily obtained using incremental reactant addition. The mode of addition of the disulfonyl chlorides to the diphenol is governed by the nature of the copolymer desired and it is possible to add incrementally or to batch-mix the reactants if desired. The various disulfonyl chlorides need not be added together but may be added one at a time or as alternate increments, again depending upon the polymer structure sought, i.e., random, random-block, block-block, etc. In addition, it is also possible to invert the order of addition of reactants and add the diphenol to the sulfonyl chlorides. The basic organic catalyst also may be added initially or during the course of the polycondensation, or it may be added incrementally during the reaction. Although benzyltrimethylammonium chloride is a particularly effective catalyst, other quaternary salts and suitable amines are effective. The amount of catalyst added may vary from less than 0.01 wt. percent to more than 1.0 wt. percent. Although the polymerization temperature may be varied over a wide range as, for example, from less than 0° C. to more than 100° C., it is most convenient to conduct the reaction at or about room temperature, i.e., 25° C.

It will be seen that the polycondensation of a diphenol with a mixture of two or more aryldisulfonyl chlorides will yield a sulfonate copolymer typically represented by unit structure formulae, wherein the various symbols have the same meaning as hereinbefore indicated and where the number of unit structures is dependent upon and equal to the number of different aryl disulfonyl chlorides involved in the copolymer preparation. A copolymer derived from two different aryl disulfonyl chlorides will, therefore, comprise the following unit structures, V and VI, in the polymer chain:

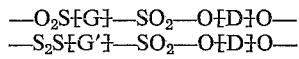

where the aromatic carbocyclic groups G, G' and D are as hereinbefore defined and where G and G' must be different, but where D and either G or G' may be the same or different. The order and relative proportions of V and VI may be widely varied as indicated above. It is to be noted that (1) the aromatic carbocyclic groups G and G' are derived from different aromatic disulfonyl halides and are bonded through aromatic ring carbon atoms directly to sulfonate group sulfur atoms, whereas (2) the aromatic carbocyclic group D is derived from a diphenol and is bonded through aromatic ring carbon atoms directly to sulfonate group oxygen atoms.

The following examples are illustrative of the preparation of polysulfonate copolymers from diphenols and mixed disulfonyl chlorides.

EXAMPLE 1

A solution of 2.892 g. (10 mmoles; 50 mole percent) of 2,4-toluenedisulfonyl chloride and 3.032 g. (10 mmoles; 50 mole percent) of 1,3-dimethyl-4,6-benzenedisulfonyl chloride in 30 ml. of methylene chloride was added over a 40 minute period to a well stirred solution of 4.566 g. (20 mmoles) of 2,2-bis(4-hydroxyphenyl)-propane, 40.5 mmoles of NaOH and two drops of a 60% aqueous solution of benzyltrimethylammonium chloride in 35 ml. of water at 29–33° C. The agitation was then continued for 60 minutes. The copolymer was precipitated with isopropanol, washed with water and isopropanol and vacuum dried. The copolymer had a softening temperature range of 139–165° C. and an intrinsic viscosity, measured in methylene chloride, at 20° C., of 0.32 dl./g. X-ray analysis showed a diffuse amorphous halo at 5.15 A. A copolymer film, cast from methylene chloride solution, was opaque and exhibited some degree of order by X-ray diffraction.

EXAMPLE 2

A solution of 3.032 g. (10 mmoles; 50 mole percent) of 1,3-dimethyl-4,6-benzenedisulfonyl chloride and 3.672 g. (10 mmoles; 50 mole percent) of 4,4'-phenyl ether disulfonyl chloride in 27 ml. of methylene chloride was added over a 40 minute period to a well stirred solution of 4.566 g. (20 mmoles) of 2,2-bis(4-hydroxyphenyl)-propane, 40.5 mmoles of NaOH and two drops of a 60% aqueous solution of benzyltrimethylammonium chloride in 35 ml. of water at 30–33° C. The agitation was continued for an additional 90 minutes. The polymer was isolated as in Example 1.

The product had a softening temperature range of 135–166° C. and an intrinsic viscosity of 1.42 dl./g. in $CH_2Cl_2$ at 20° C. X-ray analysis showed a diffuse halo at 5.20 A. The product had a tensile strength of 6800 p.s.i. The method for determining the tensile strength was a slight departure from A.S.T.M. Method D–636 in that a strip ¼" x 1 mil with a rate of draw of 2" per minute at 23° C. was utilized.

EXAMPLE 3

2,2 - bis - (4 - hydroxyphenyl) - propane (4.66 g.; 20 mmoles), 40.5 mmoles of sodium hydroxide and two drops of a 60% aqueous solution of benzyltrimethyl ammonium chloride in 45 ml. of $H_2O$ were added with stirring at 24–39° C. over a 15 minute period to 3.032 g. (10 mmoles; 50 mole percent) of 1,3-dimethyl-4,6-benzenedisulfonyl chloride and 3.672 g. (10 mmoles) of 4,4'-phenyl ether disulfonyl chloride in 45 ml. of methylene chloride. Stirring was continued for an additional 100 minutes. The polymer was isolated as in Example 1. The softening temperature range was 97–147° C., and the product had an intrinsic viscosity of 0.26 dl./g. in $CH_2Cl_2$ at 20° C. X-ray analysis showed a small amount of crystallinity.

EXAMPLE 4

2,4-toluenedisulfonyl chloride (2.892 g.; 10 mmoles; 50 mole percent) and 4,4'-phenyl ether disulfonyl chloride (3.672 g.; 10 mmoles; 50 mole percent) in 52 ml. of methylene chloride were added over a 35 minute period with stirring to 4.566 g. (20 mmoles) of 2,2-bis(4-hydroxyphenyl)-propane, 40.5 mmoles of NaOH and two drops of a 60% aqueous solution of benzyltrimethylammonium chloride in 35 ml. of water at 29–35° C. The agitation was continued for 15 minutes. The polymer was isolated as in Example 1. The softening temperature range was 120–157° C. and intrinsic viscosity of 1.03 dl./g. in $CH_2Cl_2$ at 20° C.

EXAMPLE 5

The extreme aminolytic and hydrolytic stability of polysulfonate copolymers with respect to other types of polyesters is demonstrated most dramatically by comparing the decrease in intrinsic viscosity of the polymers described in Examples 2 and 4, dissolved in a 1:1 volume mixture of morpholine and o-dichlorobenzene at 25° C. with samples of Bisphenol-A polysebacate and Bisphenol-A polycarbonate of comparable molecular weight treated in the same way. The relative rates of aminolysis of the respective samples is as follows:

| | |
|---|---:|
| Polysulfonate copolymer, Example 2 | 1 |
| Polysulfonate copolymer, Example 4 | 20 |
| Bisphenol-A polysebacate | 1500 |
| Bisphenol-A polycarbonate | >25000 |

EXAMPLE 6

1,3-dimethyl-4,6-benzenedisulfonyl chloride (3.032 g.; 10 mmoles; 50 mole percent) and 4.153 g. (10 mmoles; 50 mole percent) of 3,3'-phenylsulfone disulfonyl chloride in 56 ml. of methylene chloride were added dropwise at 25–30° C. to a solution of 4.566 g. (20 mmoles) of 2,2-bis-(4-hydroxyphenyl)-propane, 41 mmoles of NaOH and 3 drops of a 60% aqueous solution of benzyltrimethylammonium chloride in 45 ml. of water. The total addition time was 40 minutes; the reaction mass was further agitated for two hours. The polymer was isolated as in Example 1. The polymer had a softening temperature range of 132–157° C., and an intrinsic viscosity of 0.78 dl./g. in $CH_2Cl_2$ at 20° C. An X-ray analysis showed a diffuse halo at 5.20 A.

EXAMPLE 7

1,3-benzenedisulfonyl chloride (2.751 g.; 10 mmoles; 50 mole percent) and 2.892 g. (10 mmoles; 50 mole percent) of 2,4-toluenedisulfonyl chloride in 50 ml. of methylene chloride were added over 50 minutes at 27–31° C. to a solution of 4.566 g. (20 mmoles) of 2,2-bis(4-hydroxyphenyl)-propane, 41 mmoles NaOH and 4 drops of a 60% aqueous solution of benzyltrimethylammonium chloride in 50 ml. of water. The reaction mixture was stirred for 3 more hours and the polymer isolated as in Example 1.

The product had a diffuse halo at 5.10 A. Its intrinsic viscosity was 0.65 dl./g. in $CH_2Cl_2$ at 20° C. It had a softening temperature range of 124–140° C.

EXAMPLE 8

A solution of 2.751 g. (10 mmoles) of 1,3-benzenedisulfonyl chloride in 30 ml. of methylene chloride was added over a 5 minute period to a solution of 4.566 g. (20 mmoles) of 2,2-bis(4-hydroxyphenyl)-propane, 41 mmoles NaOH and 4 drops of a 60% aqueous solution of benzyltrimethylammonium chloride in 60 ml. of water. The reaction mixture was agitated for 45 minutes, then to it was added 2.892 g. (10 mmoles) of 1,3-toluenedisulfonyl chloride over a 5 minute period. The whole was stirred for 3 hours and the product isolated as in Example 1. The temperature was maintained at 27–33° C. throughout the process.

The product had a diffuse halo at 5.20 A. Its softening temperature range was at 95–138° C. and it had an intrinsic viscosity of 0.90 dl./g. in $CH_2Cl_2$ at 20° C.

EXAMPLE 9

1,3-benzenedisulfonyl chloride (2.751 g.; 10 mmoles; 50 mole percent) and 2.892 g. (10 mmoles; 50 mole percent) of 2,4-toluenedisulfonyl chloride in 60 ml. of methylene chloride were added over a 12 minute period at 27–32° C. to a solution of 7.322 g. (20 mmoles) of 2,2-bis(3,5-dichloro-4-hydroxyphenyl)-propane, 41 mmoles of NaOH and 4 drops of a 60% aqueous solution benzyltrimethylammonium chloride in 75 ml. of water. The mixture was stirred for two additional hours and the polymer was isolated as in Example 1.

The product had an intrinsic viscosity of 1.11 dl./g. in $CH_2Cl_2$ at 20° C., and a softening temperature range of 137–206° C.

EXAMPLE 10

1,3-benzenedisulfonyl chloride (1.376 g.; 5 mmoles; 20 mole percent) and 5.783 g. (20 mmoles; 80 mole percent) of 2,4-toluenedisulfonyl chloride in 100 ml. of methylene chloride were rapidly added at 0–3° C. to a solution of 5.707 g. (25 mmoles) of 2,2-bis(4-hydroxyphenyl)-propane, 51 mmoles of NaOH and 10 drops of a 60% aqueous solution of benzyltrimethylammonium chloride in 100 ml. of water. The mixture was kept at this temperature for 2 hours and at 37–39° C. for 1 hour and 40 minutes. The polymer was isolated as in Example 1.

The product had an intrinsic viscosity of 1.30 dl./g. in $C_2H_2Cl_4$ at 25° C., and a softening temperature range of 123–156° C.

EXAMPLE 11

A solution of 0.688 g. (2.5 mmoles; 10 mole percent) of 1,3-benzenedisulfonyl chloride and 6.506 g. (22.5 mmoles; 90 mole percent) of 2,4-toluenedisulfonyl chloride in 100 ml. of methylene chloride was rapidly added at 2–6° C. to a solution of 5.707 g. (25 mmoles) of 2,2-bis(4-hydroxyphenyl)-propane, 51 mmoles NaOH and 10 drops of a 60% aqueous solution of benzyltrimethylammonium chloride in 100 ml. of water. The mixture was kept at 3–5° C. for two hours and at 37–38° C. for two additional hours. The polymer was isolated as in Example 1.

The product had an intrinsic viscosity of 0.41 dl./g. in $C_2H_2Cl_4$ at 25° C. and a softening temperature range of 110–155° C.

EXAMPLE 12

The procedure of Example 11 was repeated, using 1.25 mmoles (5 mole percent) of 1,3-benzenedisulfonyl chloride and 23.75 mmoles (95 mole percent) of 2,4-toluenedisulfonyl chloride.

The product had an intrinsic viscosity of 0.53 dl./g. in $C_2H_2Cl_4$ at 25° C. and a softening temperature range of 133–163° C.

Infrared and ultraviolet spectra of the copolymers described in the above examples were consistent with the assigned polysulfonate structures.

A number of the materials of the above examples were injection molded and heat distortion temperatures and glass transition temperatures (determined by the heat distortion method) measured. The results are summarized in Table I.

*Table I*

| Polysulfonate Copolymer | Molding Temp., ° C. | Heat Distortion Temp., ° C. | Glass Transition Temp., ° C. |
| --- | --- | --- | --- |
| Example 1 | 204 | 129 | 118 |
| Example 3 | 204 | 131 | 124 |
| Example 6 | 232 | 130 | 120 |
| Example 7 | 232 | 114 | 106 |
| Example 8 | 246 | 115 | 107 |

It will be apparent that the copolymer compositions of this invention are inherently a more versatile and useful class of polyesters than the simple homopolymers and that they possess unique properties which fit them for use in many and varied plastics applications. In particular, the stability with respect to hydrolysis or aminolysis is without precedent in polyester technology. This extreme stability is important in all applications requiring exposure to moisture or humidity at elevated temperatures where retention of physical, electrical and chemical properties is required. The combination of high softening temperature, desirable strength characteristics and thermal and chemical stability make these compositions useful as thermoplastic molding compounds for the fabrication of molded parts, gaskets, tubing, gears, casings, and the like either as virgin resin or combined with such fillers as silica, carbon black, wood flour, and the like. Films are useful as packaging material, containers, covers, liners, electrical insulation, recording tapes, photographic film base, pipe wrappings, etc. Films and fibers may be oriented or drawn at suitable temperatures to permit enhancement of strength properties such as tensile and flexural strengths. Fibers may be readily formed by melt or solution spinning and are useful as yarn, thread, bristle, rope, and the like. The compositions of this invention may be readily pigmented or dyed and suitable stabilizers and plasticizers as are known in the art may be incorporated. Alloying or admixture with other resinous materials may also be readily accomplished. The very desirable combination of properties found in the present compositions make them also useful for surface coatings in paints, varnishes and enamels and their powerful adhesive qualities render them particularly useful as adhesives for plastic, rubber, metal, glass, or wood parts.

It is apparent from the foregoing examples and discussion that many widely different embodiments may be

We claim:
1. A linear polymeric composition having an intrinsic viscosity in excess of 0.3 dl./g. when measured in methylene chloride at a temperature of 20° C. and a softening temperature in excess of 97° C. comprising in its linear chain at least two different sulfonate ester structural units selected from the group:

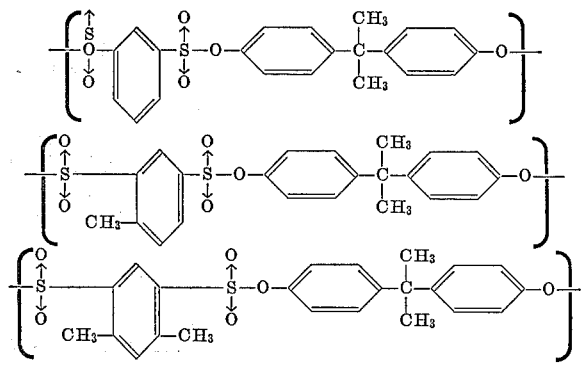

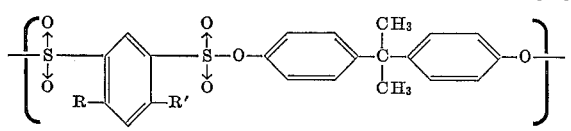

in which at least one sulfonate ester structural unit is

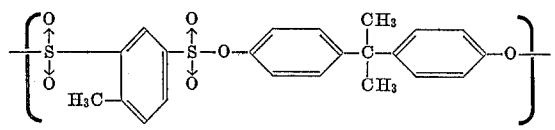

and wherein R and R' are selected from the group consisting of H and CH₃, said polymeric composition characterized in that the divalent aromatic radicals attached to the oxygen atoms in the recurring sulfonate ester linkages are the same.

2. The linear polymeric composition of claim 1, said composition having an intrinsic viscosity in excess of 0.3 dl./g. when measured in a solution of methylene chloride at 20° C. comprising in its linear chain from about 5 mole percent to about 95 mole percent sulfonate ester structural units of the formula

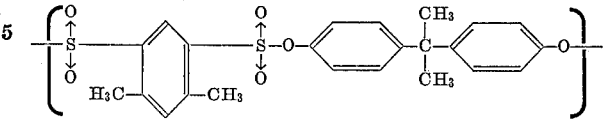

and correspondingly from about 95 mole percent to about 5 mole percent of sulfonate ester structural units of the formula

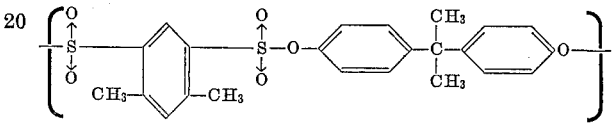

3. The copolymer composition of claim 2 wherein at least one of the structural units recurs in sequence of from about 2 to 100 units to thereby form a block copolymer.

4. A linear polymeric composition having a softening temperature in excess of 97° C. and an intrinsic viscosity in excess of 0.3 dl./g. when measured in a solution of methylene chloride at 20° C. comprising in its linear chain about 50 mole percent sulfonate ester structural units of the formula

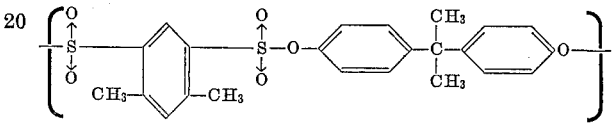

and correspondingly about 50 mole percent of sulfonate ester structural units of the formula

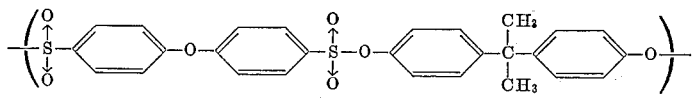

5. The copolymer composition of claim 4 wherein at least one of the structural units recurs in sequence of from about 2 to 100 units to thereby form a block copolymer.

6. A linear polymeric composition having a softening temperature in excess of 120° C. and an intrinsic viscosity in excess of 0.3 dl./g. when measured in a solution of methylene chloride at 20° C. comprising in its linear chain about 50 mole percent sulfonate ester structural units of the formula

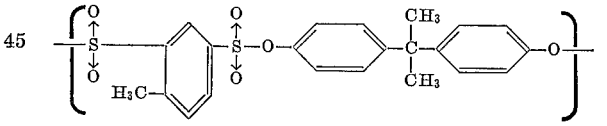

and correspondingly about 50 mole percent of sulfonate ester structural units of the formula

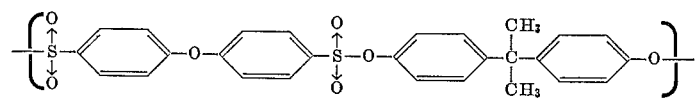

7. The copolymer composition of claim 6 wherein at least one of the structural units recurs in sequence of from about 2 to 100 units to thereby form a block copolymer.

8. A linear polymeric composition having a softening temperature in excess of 132° C. and an intrinsic viscosity in excess of 0.3 dl./g. when measured in a solution of methylene chloride at 20° C. comprising in its linear chain about 50 mole percent sulfonate ester structural units of the formula

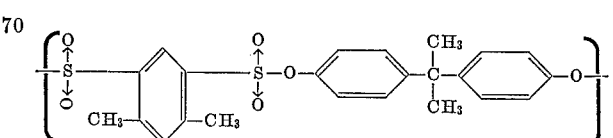

and correspondingly about 50 mole percent of sulfonate ester structural units of the formula

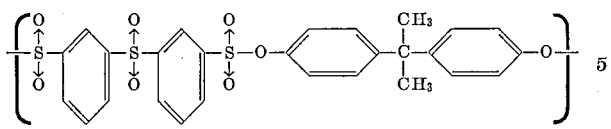

9. The copolymer composition of claim 8 wherein at least one of the structural units recurs in sequence of from about 2 to 100 units to thereby form a block copolymer.

10. The linear polymeric composition of claim 1, said composition having an intrinsic viscosity in excess of 0.3 dl./g. when measured in a solution of methylene chloride at 20° C. comprising in its linear chain from about 5 mole percent to about 95 mole percent sulfonate ester structural units of the formula

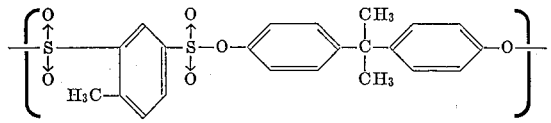

and correspondingly from about 95 mole percent to about 5 mole percent of sulfonate ester structural units of the formula

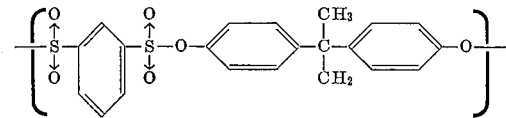

11. The copolymer composition of claim 10 wherein at least one of the structural units recurs in sequence of from about 2 to 100 units to thereby form a block copolymer.

12. The linear polymeric composition of claim 1, said composition having an intrinsic viscosity in excess of 0.3 dl./g. when measured in a solution of methylene chloride at 20° C. comprising in its linear chain from about 5 mole percent to about 95 mole percent sulfonate ester structural units of the formula

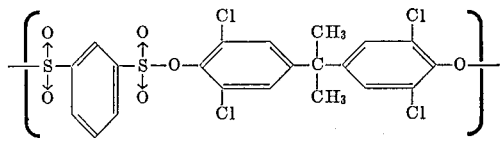

and correspondingly from about 95 mole percent to about 5 mole percent of sulfonate ester structural units of the formula

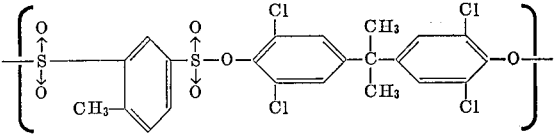

13. The copolymer composition of claim 12 wherein at least one of the structural units recurs in sequence of from about 2 to 100 units to thereby form a block copolymer.

References Cited by the Examiner

UNITED STATES PATENTS

| | | | |
|---|---|---|---|
| 2,035,578 | 3/1936 | Wagner | 260—47 |
| 2,708,617 | 5/1955 | Magat et al. | 260—47 |
| 2,875,183 | 2/1959 | Murphey | 260—79.3 |
| 3,028,364 | 4/1962 | Conix | 260—49 |

FOREIGN PATENTS

| | | |
|---|---|---|
| 565,478 | 3/1958 | Belgium. |
| 585,882 | 6/1960 | Belgium. |

WILLIAM H. SHORT, *Primary Examiner.*

HAROLD N. BURSTEIN, *Examiner.*

A. D. RICCI, J. C. MARTIN, *Assistant Examiners.*